United States Patent
Berseth et al.

(10) Patent No.: US 10,726,300 B2
(45) Date of Patent: Jul. 28, 2020

(54) SYSTEM AND METHOD FOR GENERATING AND PROCESSING TRAINING DATA

(71) Applicant: Scribe Fusion, LLC, Jacksonville, FL (US)

(72) Inventors: Matthew Thomas Berseth, Ponte Vedra, FL (US); Robert Jackson Marsh, Ponte Vedra Beach, FL (US)

(*) Notice: Subject to any disclaimer, the term of this patent is extended or adjusted under 35 U.S.C. 154(b) by 0 days.

(21) Appl. No.: 16/383,477

(22) Filed: Apr. 12, 2019

(65) Prior Publication Data

US 2019/0340466 A1  Nov. 7, 2019

Related U.S. Application Data

(60) Provisional application No. 62/665,186, filed on May 1, 2018.

(51) Int. Cl.
*G06K 9/62* (2006.01)
*G06K 9/00* (2006.01)

(52) U.S. Cl.
CPC ....... *G06K 9/6257* (2013.01); *G06K 9/00449* (2013.01); *G06K 9/6253* (2013.01); *G06K 9/6262* (2013.01); *G06K 2209/01* (2013.01)

(58) Field of Classification Search
CPC .............. G06K 9/6253; G06K 9/6262; G06K 9/00449; G06K 2209/01
See application file for complete search history.

(56) References Cited

U.S. PATENT DOCUMENTS

| 2015/0077559 A1* | 3/2015 | Wu ............... H04N 5/23267 348/148 |
| 2018/0018533 A1* | 1/2018 | Taranta, II ......... G06K 9/00416 |
| 2018/0032842 A1* | 2/2018 | Yellapragada ............ G06T 7/11 |
| 2019/0080164 A1 | 3/2019 | Duke et al. |

OTHER PUBLICATIONS

Yefeng Zheng, Huiping Li, David Doermann, A Model-based Line Detection Algorithm in Documents, Proceedings of the Seventh International Conference on Document Analysis and Recognition, 2003, pp. 44-48, Proceedings, IEEE, USA.

(Continued)

*Primary Examiner* — Qian Yang
(74) *Attorney, Agent, or Firm* — Wilson Dutra, PLLC; Camille A. Wilson (57) ABSTRACT

The present disclosure provides generally for a system and method for generating and processing training data, such as when access to training data for a form may be insufficient to effectively train an artificial entity to process the associated form. According to the present disclosure, a computer system may identify and distinguish between content data and background data from a small set of data, such as a handful of authentic forms. The computer system may remove unwanted text, noise, or other portions of an image to create an empty, blank, or scrubbed form with no data. The system may generate training examples or synthetic data from this form, which may be incorporated into training data. In some embodiments, the synthetic data may be generated into a form. The computer system may synthetically generate variations in the original form to simulate variations that may exist with expected incoming data.

19 Claims, 8 Drawing Sheets

(56) References Cited

OTHER PUBLICATIONS

Krutika Bapat, Deep Learning based Character Classification using Synthetic Dataset, Big Vision LLC blog, Jun. 28, 2018.
Brad Neuberg, Creating a Modern OCR Pipeline Using Computer Vision and Deep Learning, Dropbox Tech Blog, Apr. 12, 2017.
Bunke Varga, Perturbation Models for Generating Synthetic Training Data in Handwriting Recognition, Studies in Computational Intelligence: Machine Learning in Document Analysis and Recognition, 2008, pp. 333-360, vol. 90. Springer, Berlin, Heidelberg.

* cited by examiner

| 3 Social security wages 4862h99 | 4 Social security tax withheld |
|---|---|
| 5 Medicare wages and tips | 6 Medicare tax withheld 298c 394 |
| 7 Social security tips Sk289 | 8 Allocated tips |
| 9 Advance EIC payment | 10 Dependent care benefits 2398y4no |
| 11 Nonqualified plans | 12a See instructions for box 12 |
| 13 Statutory employee [X]  Retirement plan [X]  Third-party sick pay [ ] | 12b  8s9 | 2347 |
| 14 Other Akkdf 22okcla Sldkc bslkncoo2873 | 12c  127s | s09d |
| | 12d |

| 3 Social security wages 4862h99 | 4 Social security tax withheld |
|---|---|
| 5 Medicare wages and tips | 6 Medicare tax withheld 298c 394 |
| 7 Social security tips Sk289 | 8 Allocated tips |
| 9 Advance EIC payment | 10 Dependent care benefits 2398y4no |
| 11 Nonqualified plans | 12a See instructions for box 12 |
| 13 Statutory employee [X]  Retirement plan [X]  Third-party sick pay [ ] | 12b  8s9  2347 |
| 14 Other Akkdf 22okcla Sldkc bslkncoo2873 | 12c  127s s09d |
| | 12d |

620

| | |
|---|---|
| 3 Social security wages<br>4862h99 | 4 Social security tax withheld |
| 5 Medicare wages and tips | 6 Medicare tax withheld<br>298c 394 |
| 7 Social security tips | 8 Allocated tips |
| 9 Advance EIC payment | 10 Dependent care benefits<br>2398y4no |
| 11 Nonqualified plans | 12a See instructions for box 12 |
| 13 Statutory employee [X] Retirement plan [X] Third-party sick pay [ ] | 12b 8s9 2347 |
| 14 Other<br>Akkdf 22okolz<br>Sldkc bslkncdd2873 | 12c 127s s09d<br>12d |

| | |
|---|---|
| 3 Social security wages<br>4862h99 | 4 Social security tax withheld |
| 5 Medicare wages and tips | 6 Medicare tax withheld<br>298c 394 |
| 7 Social security tips | 8 Allocated tips |
| 9 Advance EIC payment | 10 Dependent care benefits<br>2398y4no |
| 11 Nonqualified plans | 12a See instructions for box 12 |
| 13 Statutory employee [X] Retirement plan [X] Third-party sick pay [ ] | 12b 8s9 2347 |
| 14 Other<br>Akkdf 22okolz<br>Sldkc bslkncdd2873 | 12c 127s s09d<br>12d |

SYSTEM AND METHOD FOR GENERATING AND PROCESSING TRAINING DATA

CROSS-REFERENCE TO RELATED APPLICATION

This application claims priority to and the full benefit of U.S. Provisional Patent Application Ser. No. 62/665,186, filed May 1, 2018, and titled "SYSTEM AND METHOD FOR GENERATING AND PROCESSING TRAINING DATA", the entire contents of which are incorporated in this application by reference.

BACKGROUND OF THE DISCLOSURE

Artificial intelligence (AI) refers to the development of computer systems to perform tasks such as visual perception, speech recognition, or decision-making. Traditional goals of AI include learning, natural language processing, and computer vision. Each of these may refer to a different focus area for AI. For example, natural language processing refers to a machine's ability to read and understand human language. This may allow for information retrieval, text mining, or machine translation. By way of another example, computer vision allows machines to recognize speech, text, faces, or objects in images or video.

Machine learning came about through advancements in the study of pattern recognition and computational learning theory. Machine learning is a field of computer science that sometimes uses statistical techniques to teach computer systems how to improve on a particular task without being explicitly programmed to do so. Using machine learning, computer systems may be able to provide descriptive, diagnostic, predictive, or prescriptive information or feedback.

Machine learning usually uses input data that serves as a training data set to develop a model to achieve its tasks. The model uses training data to learn patterns within the data set so that the model algorithms may make correct and proper predictions. Training data may be a set of examples, such as inputs with corresponding labels or values. Training data may include a target, which a model would try to achieve and be compared to. In some cases, the model may be unsupervised and must learn from a training data set with only inputs and no corresponding targets. Learning models may be based on support vector machines, linear regression, logistic regression, naïve Bayes, linear discriminant analysis, decision trees, and neural networks.

Deep learning is a subclass of machine learning. Deep learning may use neural networks to help train a computer system. A neural network consists of processing elements that are interconnected to reproduce and model nonlinear processes, originally inspired by the human brain. The neural networks can contain hierarchical levels of representations corresponding to different levels of abstraction. The machine itself determines what characteristics they find relevant to determine an answer. For example, in image recognition, machines may learn what images are labeled "car" and "not car." Using these results, the machine may review other images to identify whether other images have cars or not.

Usually, training data examples are labeled in advance. For example, an object recognition system may be given thousands of labeled images of a variety of types of objects, to be tasked with finding visual patterns in the images to consistently correlate with particular labels. Training data may be labeled by a person, or the object recognition system may try to generate its own labels once it receives a set of training data.

Since machine learning may need historical data to learn patterns and optimize algorithms, larger training sets generally produce better results. Deep learning models in particular may benefit from a greater volume of training data compared to linear or less complex models. One of the issues with training for machine learning is that there are often very few historical examples available and generating additional examples, particularly if human labeling is needed, is costly and time-consuming. To produce better models, and to enhance or expedite machine learning, there is a need for a greater volume of reliable and varied training data.

SUMMARY OF THE DISCLOSURE

What is needed is a system and method for generating training data. This may allow for the creation of training data from very few historical examples. By generating a larger training dataset, a machine learning model that provides consistently better results may be developed. In some embodiments, a system may start with a small training dataset and build more based on those examples.

For example, the training dataset may consist of images. In some implementations, the system may remove unwanted text or other portions of an image to create an empty, blank, or scrubbed form with no data. In some aspects, the system may generate many training examples or synthetic data from this form, adding generated data to the form. In some implementations, the computer system may simultaneously generate training masks or other labels to represent the desired output of the model.

In some aspects, the system may synthetically generate variations in the original form to simulate variations that may exist with expected incoming data. In some embodiments, the system may synthetically generate training data after reaching a predetermined success rate or validation rate. In some implementations, the system may generate training data after a range of supervised learning, which may include completely labeled information, incomplete information, or by feedback based on performance. In some aspects, the system may have more freedom to generate training data once it consistently performs at a certain level. In some embodiments, a user or trainer may determine whether the system is capable of accurately producing training data. In some implementations, the system may generate data after unsupervised learning, meaning the system generates its own labels.

The present disclosure relates to a process for generating and processing training data comprising the process steps of receiving a first set of forms comprising one or both authentic forms and synthetic forms with a first set of data comprising one or both authentic data and synthetic data; analyzing the first set of forms and the first set of data; identifying content data and background data within the first set of forms and the first set of data; separating content data from background data within at least a portion of the first set of data; generating a first synthetic form comprising at least a portion of background data based on at least a portion of content data and background data; generating a plurality of sets of synthetic data based on content data and background data within the first authentic form and the first set of data; and creating a set of training data for at least a portion of the first set of forms, wherein the creating is based on at least a portion of one or more of the first synthetic form, the first set of forms, the plurality of sets of synthetic data, and the first set of data to.

Implementations may comprise one or more of the following features. In some aspects, the set of training data may comprise a quantity of data sufficient to train an artificial entity to process the first authentic form. In some embodiments, the process may further comprise the process step of populating one or both the synthetic form or the background data within the first set of forms with at least a portion of one or both the plurality of sets of synthetic data and the first set of data. In some implementations, the process may further comprise the process step of shifting at least a portion of one or both the plurality of sets of synthetic data and the first set of data to an incorrect position within one or both the synthetic form or the background data.

In some aspects, the process may further comprise the process step of adding noise to at least a portion of one or more of the plurality of sets of synthetic data, the first set of data, the synthetic form, or the background data, wherein adding noise is variable. In some implementations, the process may further comprise the process step of categorizing the content data based at least in part on the background data. In some embodiments, categorization of the content data may identify the content data as one or more of alphabetic text, numeric text, and alphanumeric text. In some aspects, categorization of the content data may identify the content data as one or both sensitive data and non-sensitive data.

In some embodiments, the first set of forms may comprise a plurality of form types, and the process further may comprise identifying a plurality of form types for at least a portion of the first set of forms. In some aspects, the process may further comprise associating the first set of data with the plurality of form types, and wherein generating the first synthetic form and the plurality of synthetic form data occurs for each of the plurality of form types. In some implementations, creating of the set of training data occurs for each of the plurality of form types. Implementations of the described techniques may comprise hardware, a method or process, or computer software on a computer-accessible medium.

In some aspects, corresponding computer systems, apparatus, and computer programs recorded on one or more computer storage devices, may be configured to perform the actions of the methods. The present disclosure relates to a process for generating and processing training data comprising the process steps of: receiving a first set of data comprising one or both authentic data and synthetic data for a first form; identifying content data and background data within the first set of data; separating content data from background data; generating a plurality of sets of synthetic data based on at least a portion of identified content data, identified background data, and the first set of data; and integrating the plurality of sets of synthetic data and the first set of data to create a set of training data for the first form.

Implementations may comprise one or more of the following features. In some aspects, the set of training data may comprise a quantity of data sufficient to train an artificial entity to process the first form. In some embodiments, the process may further comprise the process step of categorizing the content data based at least in part on the background data. In some aspects, categorization of the content data may identify the content data as one or more of alphabetic text, numeric text, and alphanumeric text. In some implementations, categorization of the content data may identify the content data as one or both sensitive data and non-sensitive data.

In some embodiments, the process may further comprise the process step of generating a first synthetic form based on at least a portion of content data and background data, wherein the process further integrates the first synthetic form to create the set of training data. In some aspects, the process may further comprise the process step of populating the synthetic form with at least a portion of one or both the first set of data and the plurality of sets of synthetic data. In some implementations, the process may further comprise the process step of shifting at least a portion of one or both the plurality of sets of synthetic data and the first set of data to an incorrect position within one or both the synthetic form or the background data. In some aspects, the process may further comprise the process step of adding noise to at least a portion of one or more of the plurality of sets of synthetic data, the first set of data, the synthetic form, or the background data, wherein adding noise is variable. Implementations of the described techniques may comprise hardware, a method or process, or computer software on a computer-accessible medium.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for a system and method for generating and processing training data. According to the present disclosure, a computer system can start with a small training dataset. For example, the training dataset may consist of images. In some implementations, the computer system may remove unwanted text or other portions of an image to create an empty, blank, or scrubbed form with no data. In some aspects, the computer system may generate many training examples or synthetic data from this form, adding generated data to the form. In some implementations, the computer system may simultaneously generate training masks or other labels to represent the desired output of the model. In some aspects, the computer system may synthetically generate variations in the original form to simulate variations that may exist with expected incoming data.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Content Data: as used herein refers to data and information input by a user or system. In some aspects, content data may be inserted based on the background data, such as in response to a prompt on a form or document. Content data may be integrated into a form automatically or manually, such as by hand, through use of a computer, through use of a device, or combinations thereof. Content data may comprise character images, handwritten font, type font, stampings, embossment, and combinations thereof, as non-limiting examples. In some aspects, character images may include characters, symbols, graphics, illustrations, markings, other notations, and combinations thereof.

Synthetic Data: as used herein refers to fabricated data that may serve as content data, wherein the fabricated data may be generated to create training data.

Synthetic Forms: as used herein refers to a document or image comprising background data and content data, wherein fabricated forms may serve as background data and the fabricated forms may be generated to create training data. In some embodiments, a synthetic form may include a clean form that contains form boxes and labels for data without data elements. In some implementations, a synthetic form may include a clean data mask that contains data values but not a form template. In some aspects, a synthetic form may combine a clean form and a clean data mask as well as "non-clean" forms that introduce distortions or noise.

Noise: as used herein refers to aberrations on an authentic form or a synthetic form that does not comprise background data or content data.

Dropout: as used herein refers to a removal of background data, wherein the remaining data may comprise content data. In some aspects, the dropout may occur after a removal of noise, which may allow for a more precise removal of background data.

Authentic Data: as used herein refers to content data that originates from an actual entity, in contrast to synthetic data.

Authentic Forms: as used herein refers to a document or image comprising background data and content data, wherein the background data originates from an actual entity, in contrast to synthetic forms. In some aspects, authentic forms may comprise one or more paper forms, signs, computer/device screens, labels, and electronic documents (such as word processing documents, portable document format documents, or image files, as non-limiting examples).

User: as used herein refers to any entity that may insert or input content data. In some aspects, a user may comprise an individual who may be inputting content data on behalf of herself or on behalf of another. In some embodiments, a user may comprise an artificial entity, such as software or artificial intelligence. In some implementations, multiple users may contribute to a single form, whether authentic or synthetic. In some aspects, the multiple users may input the data at the same or different times, location, or entities.

Background Data: as used herein refers to data and information on a form that may be universal to that form, such as form prompts and general form information, as non-limiting examples. In some aspects, general form information may comprise form identification, including form numbers or information related to the source, such as the government entity or company providing the form. In some embodiments, general form information may comprise page numbers or disclaimers that may be included with the form. In some implementations, prompts may comprise text or images that indicate to a user what content to insert in which locations on the form, such as name, date, address, or other requested information.

Artificial Entity: as used herein refers to any computer-implementing mechanism, such as artificial intelligence, machine learning algorithms, statistical algorithms, or rules-based system, as non-limiting examples.

Element: as used herein refers to a small unit of an image that may be individually processed, wherein an image refers to any combination of form data and the form. For example, an element may comprise a pixel, super pixel, or voxel, as non-limiting examples.

Category: as used herein refers to tagging or classifying content data based on predefined characteristics and parameters. Categorization refers to assigning a category to at least a portion of the content data or background data. In some aspects, a category may be a general type, such as sensitive or non-sensitive or hand input or computer input. Sensitive data may include credit card information, social security numbers, or health information, as non-limiting examples. In some embodiments, a category may be a specific type, such as address, date, insurance code, or VIN, as non-limiting examples. In some implementations, the specific types may be further distinguished, such as identifying a birth date from a form completion date or identifying a health care provider name from a patient name from a guardian's name from a claims adjuster name. In some aspects, categorization may be based on isolated element analysis, context of proximate elements, comparisons of background data to content data, or combinations thereof, as non-limiting examples.

Figure 1:
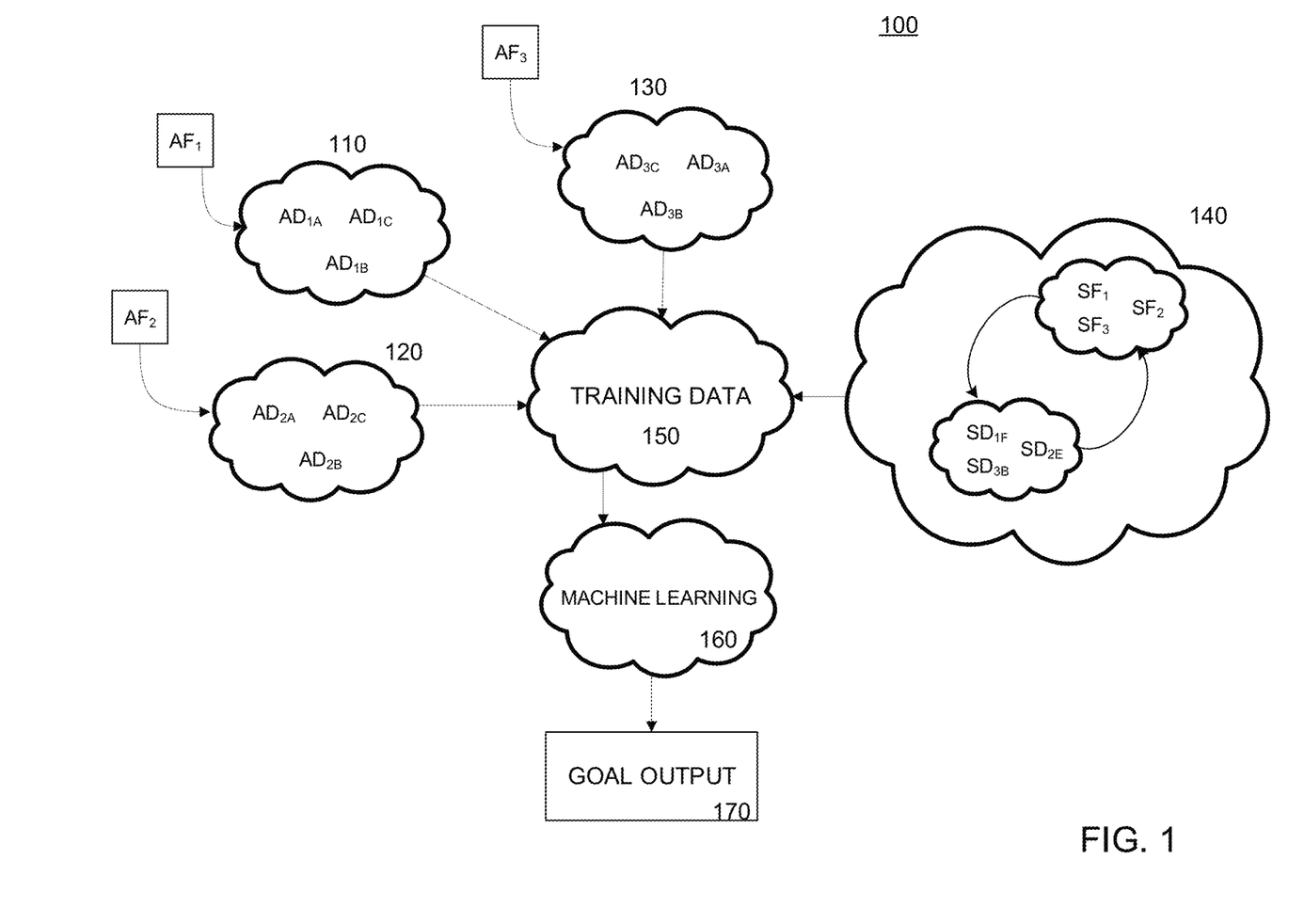
FIG. 1 illustrates exemplary document processing steps, according to some embodiments of the present invention.

Referring now to FIG. 1, an exemplary system flow chart 100 is illustrated. In some embodiments, a small set of authentic data 110, 120, 130 may be insufficient to build enough training data 150 to allow for machine learning to perform an effective analysis and identify accurate trends within the training data 150. In some implementations, it may be useful to augment and amplify the training data 150. In some embodiments, simply duplicating the small set of authentic data may produce a misleading data set. For example, where the small sample size comprises what could be determined to be an anomaly or outlying data, duplication may erroneously consider the anomaly or outlying data as standard data, potentially skewing the analysis.

In some aspects, the original set of authentic data 110, 120, 130 may be received already extracted from authentic forms, wherein the original set may comprise one or both content data and background data. In some embodiments, the original set of authentic data 110, 120, 130 may still need to be pulled from the authentic forms and separately identified as content data and background data.

In some aspects, training data 150 may be received from at least one authentic source and at least one synthetic source, wherein the synthetic source may utilize authentic data 110, 120, 130 as a foundation for generating synthetic data 140. In some embodiments, authentic data may originate from a single source, such as from one entity, one department, or one user as non-limiting examples. In some aspects, authentic data may be received from a plurality of sources, such as from different entities, different departments, different users, and combinations thereof. In some implementations, authentic data for a single authentic form may be received separately, such as when the authentic data may submitted by different users.

In some aspects, training data 150 may be utilized in a machine learning system 160, wherein the machine learning system 160 may produce a goal output 170. In some embodiments, a set of training data 150 may be utilized to produce multiple goal outputs. Different goal outputs may allow for a range of uses for the same set of training data 150. For example, an entity may want different goal outputs for different uses. As another example, different entities may want different goal outputs.

In some aspects, training data could be generated in infinite permutations of synthetic data, authentic data, authentic forms, and synthetic forms. In some embodiments, a set of data created as training data may exist for only an instance and then never again. In some implementations, a data set may comprise content data and background data for multiple forms or form types. In some aspects, at least a portion of the data set may be stored, such as for use in other training sets or for quality control, as non-limiting examples.

In some embodiments, the system may utilize an algorithm model, such as machine learning. As other examples, the algorithm model may comprise generalized linear models, support vector machines, nearest neighbor, decision trees, boosted or bagged decision trees, ensemble methods, Boltzmann machines, auto encoders, or neural networks. In some aspects, the system may utilize a combination of algorithm models.

Figure 2:
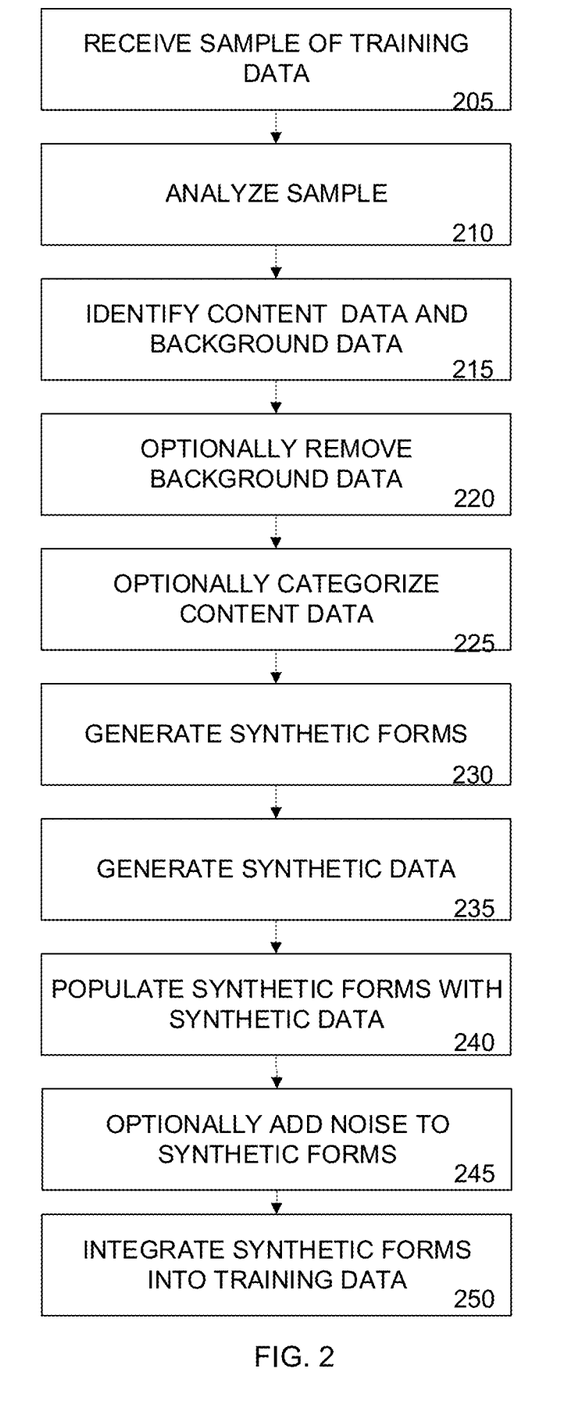
FIG. 2 illustrates exemplary process steps for generating synthetic data, according to some embodiments of the present invention.

Referring now to FIG. 2, exemplary process steps for generating synthetic data is illustrated. At 205, at least one authentic form with a set of authentic data may be received. At 210, the authentic form and authentic data may be analyzed. At 215, content data and background data may be identified within the authentic form with authentic data. In some embodiments, at 220, content data may be separated from background data. In some aspects, at 225, content data may be categorized, which may identify content types within the authentic form. At 230, synthetic forms may be generated, and at 235, synthetic data may be generated. At 240, synthetic forms may be populated with synthetic data. In some embodiments, at 245, noise may be added to the synthetic forms and synthetic data. In some aspects, the addition of noise at 245 may be variable, which may allow for different noise applications between one or more segments, forms, or data sets. At 250, synthetic forms with synthetic data may be integrated into the training data, wherein the synthetic forms and data may be combined with authentic forms and data.

In some embodiments, content data may be categorized into alphabetic text, numeric text, and alphanumeric text. In some aspects, identifying the types of text for each field of the form may allow for generation of realistic synthetic data. In some implementations, content data may be categorized by input field, such as address, name, birthdate, or phone number, as non-limiting examples. In some embodiments, identifying input fields may allow for generation of more realistic synthetic data than synthetic data generated based on text types. In some implementations, categorization may distinguish between sensitive and non-sensitive material, which may flag a data set for increased security. For example, categorization may identify health related data that may need to be HIPPA compliant. In some aspects, identifying that a field contains alphanumeric text may not suggest a format.

Many fields may contain both letters and numbers, such as addresses, codes, birthdates, as non-limiting examples. Further categorization by input field may allow for more accurate training data. For example, where a form may not explicitly force a particular format for a birthdate, users may input a birthdate in a range of formats. Formats may include "Month Day, Year," "MM/DD/YY," "MMDDYY." For example, if a birthdate field is interpreted as only containing numbers, which may be possible with a small sample size of authentic data, versions with both letters and numbers, may be misread or excluded. Similarly, if a field is interpreted as only containing numbers, the synthetic data for that field may only contain numbers, which may affect the accuracy of the training data.

In some embodiments, a user may verify whether synthetic data is similar to authentic data. In some implementations, the system may generate synthetic data after an authentic data analysis threshold is reached. In some aspects, a user may test the system's capability to produce accurate or similar synthetic data before the system starts producing synthetic data. In some embodiments, a user may eliminate historical data that may affect or skew how synthetic data is produced. In some implementations, a user may get review or tweak synthetic data after the system creates a model.

In some aspects, the processing may generate the synthetic data by element, wherein the system may generate and add elements as part of the background data, content data, or noise. In some embodiments, the generation may add the element in the incorrect location or state, which may simulate a skewed, deformed, or translated portion of the form, as non-limiting examples. In some implementations, elements may overlap, which may simulate overlap between one or more noise, background data, and content data. In some aspects, elements may be added in the correct position and state, which may simulate a correctly filled out form. For example, where at least a portion of the form may be digitally input, content data may populate in the correct position.

In some embodiments, masks may be developed for at least a portion of a form, wherein the mask may comprise one or more background data, content data, and noise. For example, a background data mask may be used as a base to generate a training data set for a form. In some aspects, noise and content data may be generated and combined with the mask.

Figure 3:
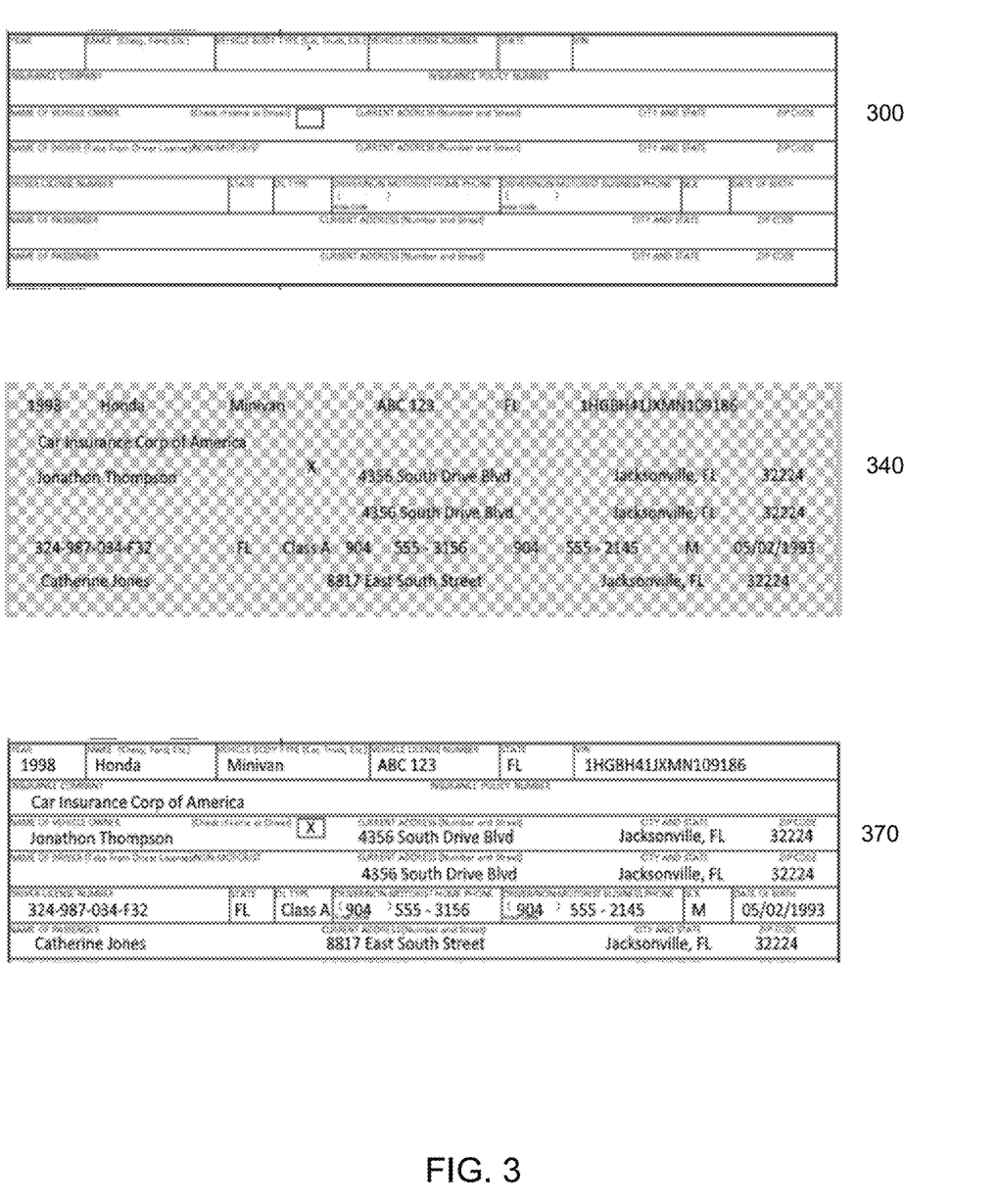
FIG. 3 illustrates exemplary synthetic form generation steps, according to some embodiments of the present invention.

Referring now to FIG. 3, exemplary synthetic form generation steps are illustrated, wherein the synthetic forms may be generated with synthetic data. In some aspects, a baseline synthetic form may comprise a clean synthetic form 300 and clean synthetic data mask 340. In some embodiments, the clean synthetic form 300 may comprise form boxes and labels for the data. In some implementations, the clean synthetic form 300 may comprise background data and may lack synthetic data. In some aspects, the clean synthetic data mask 340 may comprise data values. In some embodiments, the clean synthetic form 300 may be combined with the clean synthetic data mask 340 to create a merged synthetic form 370. In some implementations, specific aspects may be identified to form part of the mask.

In some aspects, a clean synthetic form 300 may start from an authentic or standardized form. In some embodiments, a synthetic form 300 may be generated without a base or standardized form. In some implementations, the system may generate a form based on input fields. In some aspects, the system may generate up to a certain number of forms based on a predefined or preset goal. In some embodiments, the goal may be qualitative or quantitative. In some implementations, the system may create a goal to achieve before a user is involved and confirms or redirects as necessary.

Figure 4A:
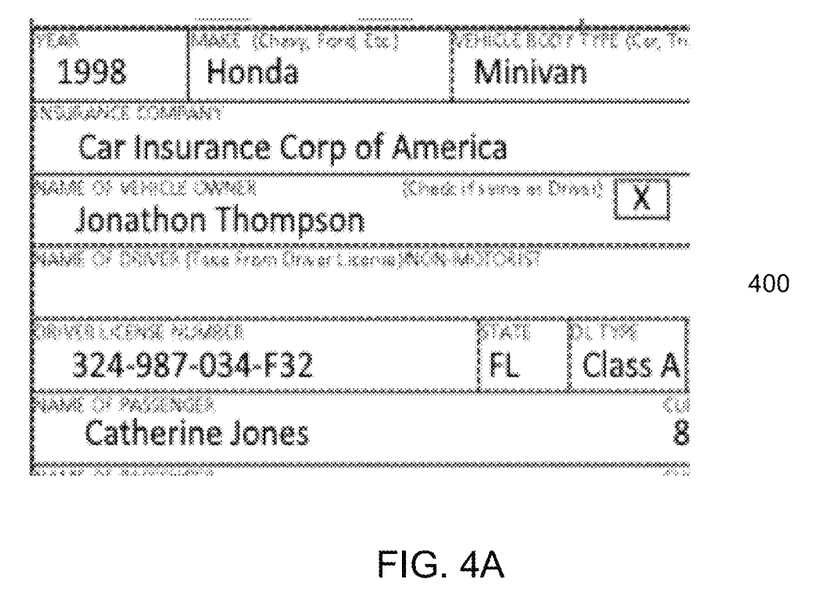
FIG. 4A illustrates exemplary synthetic forms with noise, according to some embodiments of the present invention.

Referring now to FIG. 4A, an exemplary synthetic form 400 with noise on the background data is illustrated, wherein the development steps may be used to integrate noise into the background data of the synthetic form 400. In some aspects, noise may be integrated into the background data of a synthetic form 400, wherein the noise may be applied to a clean synthetic form mask. In some embodiments, applying noise to a clean synthetic form mask may allow for the same noise to be applied to multiple synthetic content data sets. In some aspects, the background data elements may be distorted slightly by adding artificial salt or pepper, which is white elements in random locations, which may degrade the overall quality of the form and may simulate what a form may look like after being processed by a fax machine, camera, scanner, or other device.

Figure 4B:
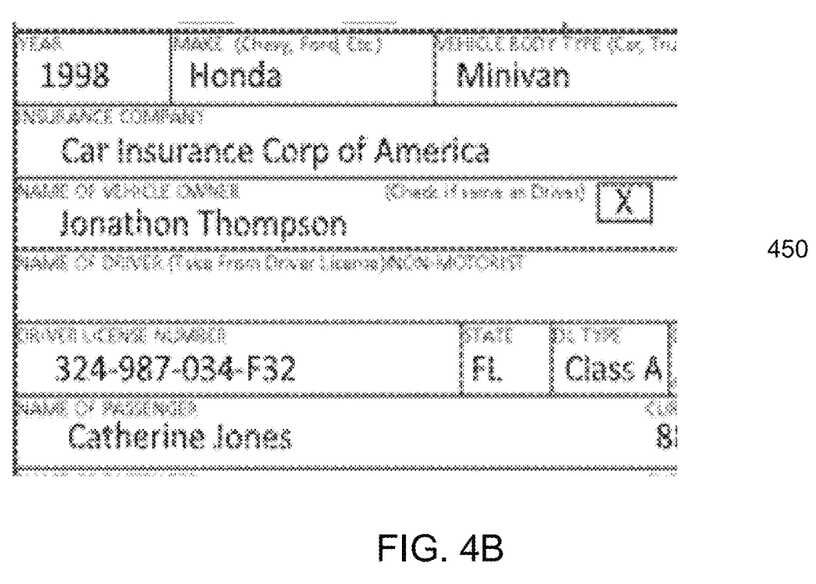
FIG. 4B illustrates exemplary synthetic forms with noise, according to some embodiments of the present invention.

Referring now to FIG. 4B, an exemplary synthetic form 450 with noise on both the background data and content data is illustrated, wherein the development steps may be used to integrate noise into the background data and content data of the synthetic form. In some embodiments, noise may be integrated into both the background data and content data of a synthetic form 450. In some aspects, the noise may be added to the background data and the content data separately, such as described in FIG. 4A.

In some implementations, the noise may be integrated to both the background data and content data after the background data and content data have been merged. In some embodiments, the system may generate high quality, representative synthetic images by degrading the form template and mask independent of each other or after they have been combined. For example, this type of degradation may replicate what would happen if the form was transmitted through a fax machine.

Figure 5:
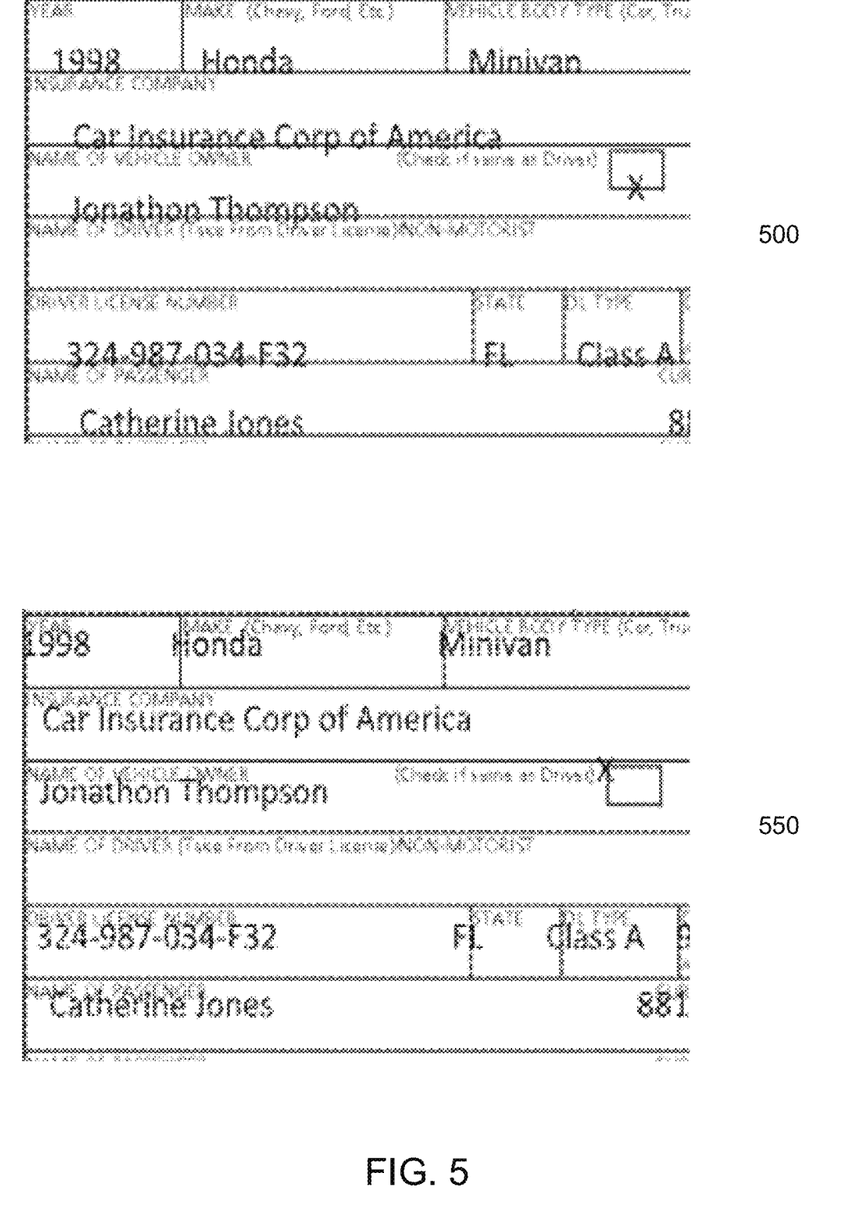
FIG. 5 illustrates exemplary document processing steps, according to some embodiments of the present invention.

Referring now to FIG. 5, exemplary document development steps are illustrated, wherein the development steps may be used to translate the mask to different coordinates. In some aspects, synthetic data and synthetic form images may be combined to create high quality synthetic images. In some implementations, the mask may be translated from the original x, y coordinates to new x, y coordinates by adding or subtracting a small number of elements from the mask. In some implementations, a synthetic form 500 may have random noise added to the image and have the location of the data shifted along the y axis so the data is overlapping with the form elements. In some implementations, a synthetic form 550 may have random noise added to the image and have the location of the data shifted along the x axis so the data is overlapping with the form elements.

In some aspects, noise may comprise adding random white elements to the form and data. In some implementations, noise may comprise translating the data elements of high quality synthetic images. In some embodiments, noise may comprise removing sections of the horizontal and vertical form region lines. In some aspects, noise may comprise deforming the synthetic form using elastic transformations. In some implementations, noise may comprise adding random horizontal and vertical lines to the form.

In some embodiments, noise may comprise a zoomed in or out copy of a synthetic form, such as a section enlargement or a portion of a document. In some aspects, noise may comprise a changed aspect ratio of the synthetic form. In some embodiments, noise may comprise random elements within the synthetic form, such as black elements, grayscale, color variety or combinations thereof, as non-limiting examples. In some implementations, noise may comprise a dilated synthetic form, eroded synthetic form, or combinations thereof.

Figure 6A:
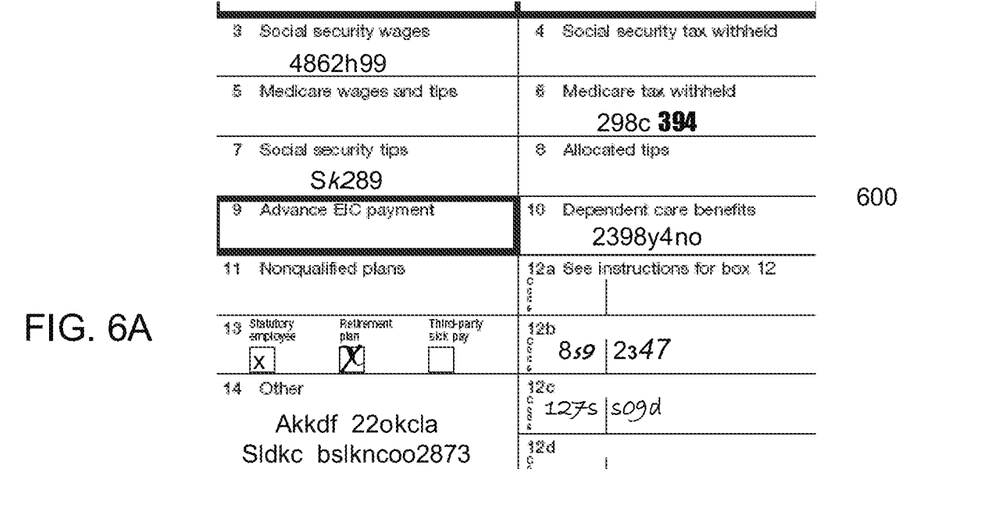
FIG. 6A illustrates an exemplary base synthetic segment, according to some embodiments of the present invention.
Figure 6B:
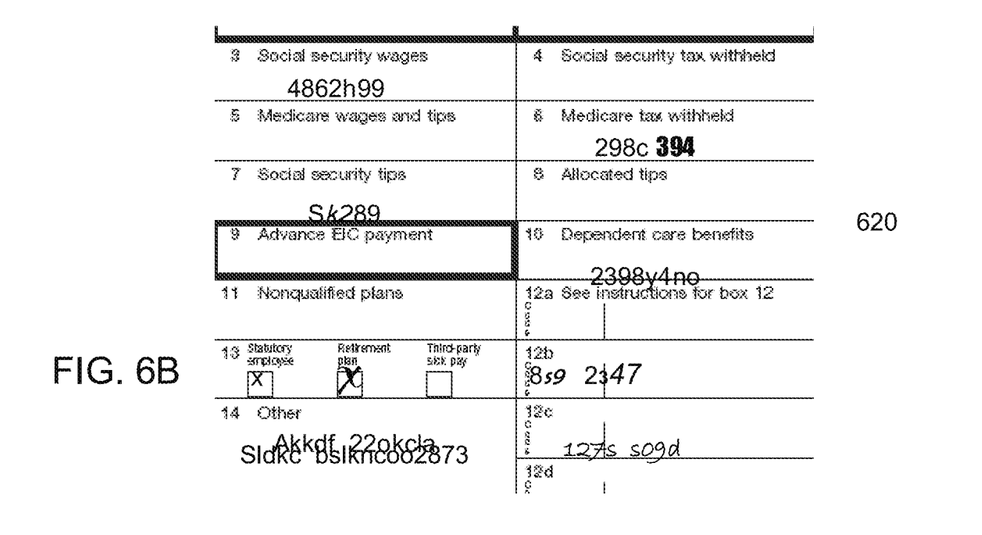
FIG. 6B illustrates an exemplary translated synthetic segment, according to some embodiments of the present invention.

Referring now to FIGS. 6A-6D, exemplary synthetic segment generation steps 600 620, 650, 670 are illustrated. In some embodiments, such as illustrated in FIG. 6A, a base synthetic segment 600 may comprise clean background data and content data, wherein both the background data and content data may be in the correct state and location. In some aspects, such as illustrated in FIG. 6B, a portion of the content data may be translated in a translated synthetic segment 620, wherein a portion of content data may be shifted to an incorrect position.

Figure 6C:
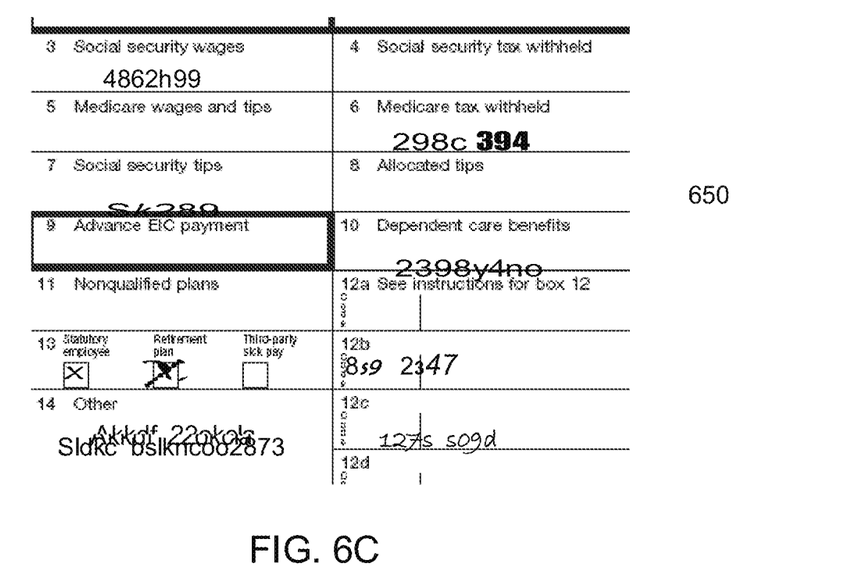
FIG. 6C illustrates an exemplary skewed synthetic segment, according to some embodiments of the present invention.
Figure 6D:
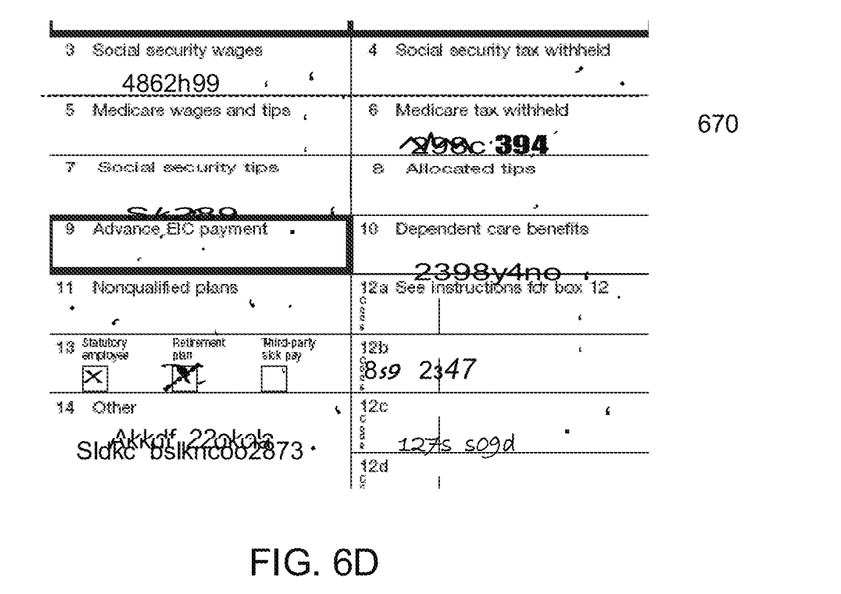
FIG. 6D illustrates an exemplary complete synthetic segment, according to some embodiments of the present invention.

In some implementations, such as illustrated in FIG. 6C, a portion of one or both the background data and content data may be skewed or deformed in a skewed synthetic segment 650, which may simulate faxing, copying, scanning, or combinations that may exacerbate deformation. In some embodiments, such as illustrated in FIG. 6D, noise may be added to develop a complete synthetic segment 670.

Figure 7:
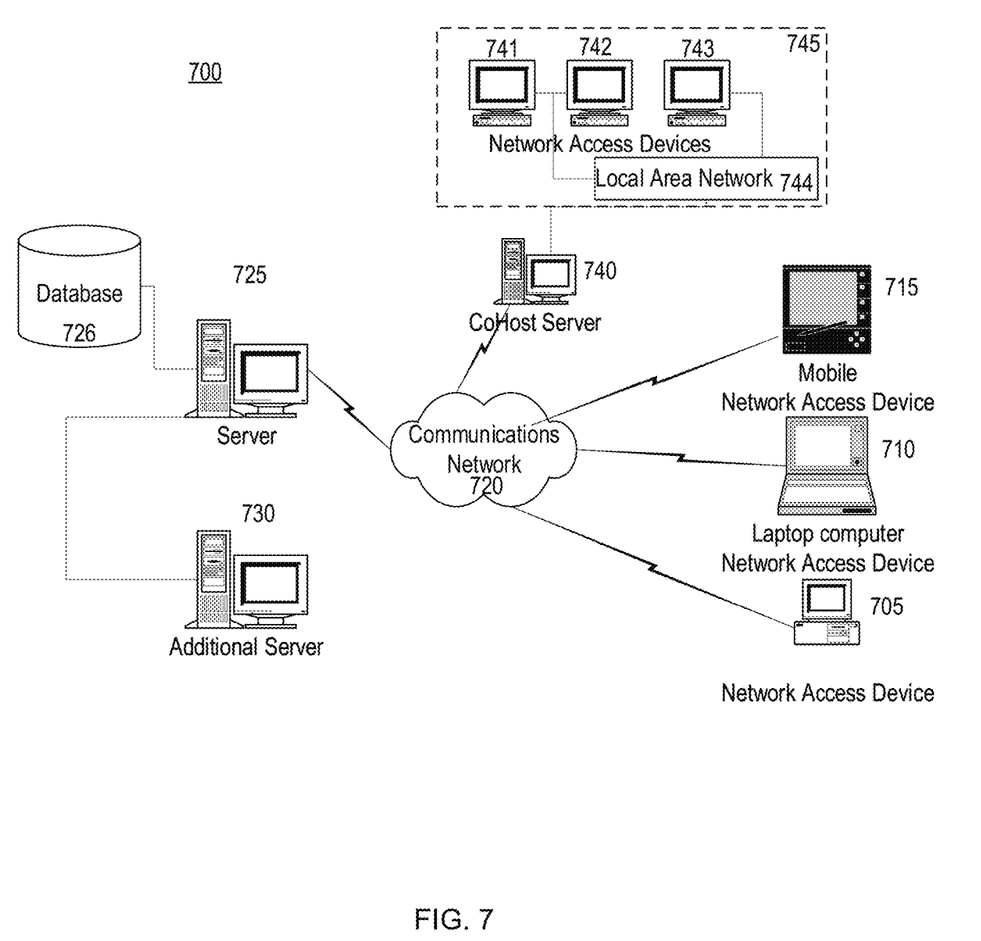
FIG. 7 illustrates an exemplary processing and interface system, according to some embodiments of the present invention

Referring now to FIG. 7, an exemplary processing and interface system 700 is illustrated. In some aspects, access devices 715, 710, 705, such as a paired portable device 715 or laptop computer 710 may be able to communicate with an external server 725 though a communications network 720. The external server 725 may be in logical communication with a database 726, which may comprise data related to identification information and associated profile information. In some embodiments, the server 725 may be in logical communication with an additional server 730, which may comprise supplemental processing capabilities.

In some aspects, the server 725 and access devices 705, 710, 715 may be able to communicate with a cohost server 740 through a communications network 720. The cohost server 740 may be in logical communication with an internal network 745 comprising network access devices 741, 742, 743 and a local area network 744. For example, the cohost server 740 may comprise a payment service, such as PayPal or a social network, such as Facebook or a dating web site.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A process for generating and processing training data comprising the process steps of:
   receiving a first set of forms with a first set of data;
   analyzing the first set of forms and the first set of data wherein each form in the first form set and the first set of data comprises a plurality of elements;
   identifying content data and background data within the first set of forms and the first set of data, wherein the identifying comprises labeling at least a portion of elements within the first set of forms and the first set of data with one or more of noise, background data, or content data;
   separating content data from background data within at least a portion of the first set of data;
   generating a first synthetic form comprising at least a portion of background data;
   generating a plurality of sets of synthetic data based on content data and background data within the first synthetic form and the first set of data; and
   building a set of training data for at least a portion of the first set of forms, wherein the building is based on at least a portion of one or more of the first synthetic form, the first set of forms, the plurality of sets of synthetic data, and the first set of data.

2. The process of claim 1, wherein the set of training data comprises a quantity of data sufficient to train an artificial entity to process the first authentic form.

3. The process of claim 1, further comprising the process step of shifting at least a portion of one or both the plurality of sets of synthetic data and the first set of data to an incorrect position within one or both the synthetic form or the background data.

4. The process of claim 3, further comprising the process step of adding noise to at least a portion of one or more of the plurality of sets of synthetic data, the first set of data, the synthetic form, or the background data, wherein adding noise is variable.

5. The process of claim 1, further comprising the process step of categorizing the content data based at least in part on the background data.

6. The process of claim 5, wherein categorization of the content data identifies the content data as one or more of alphabetic text, numeric text, and alphanumeric text.

7. The process of claim 5, wherein categorization of the content data identifies the content data as one or both sensitive data and non-sensitive data.

8. The process of claim 1, wherein the first set of forms comprises a plurality of form types, and the process further comprises identifying a plurality of form types for at least a portion of the first set of forms.

9. The process of claim 8, further comprising associating the first set of data with the plurality of form types, and wherein generating the first synthetic form and the plurality of synthetic form data occurs for each of the plurality of form types.

10. The process of claim 9, wherein the creating of the set of training data occurs for each of the plurality of form types.

11. A process for generating and processing training data comprising the process steps of:
   receiving a first set of data, wherein each form in the first form set and the first set of data comprises a plurality of elements;
   identifying content data and background data within the first set of data, wherein the identifying comprises labeling at least a portion of elements within the first set of data;
   separating content data from background data;
   generating a plurality of sets of synthetic data based on at least a portion of identified content data, identified background data, and the first set of data; and
   integrating the plurality of sets of synthetic data and the first set of data to create a set of training data for the first form.

12. The process of claim 11, wherein the set of training data comprises a quantity of data sufficient to train an artificial entity to process the first form.

13. The process of claim 11, further comprising the process step of categorizing the content data based at least in part on the background data.

14. The process of claim 13, wherein categorization of the content data identifies the content data as one or more of alphabetic text, numeric text, and alphanumeric text.

15. The process of claim 13, wherein categorization of the content data identifies the content data as one or both sensitive data and non-sensitive data.

16. The process of claim 11, further comprising the process step of generating a first synthetic form based on at least a portion of content data and background data, wherein the process further integrates the first synthetic form to create the set of training data.

17. The process of claim 16, further comprising the process step of populating the first synthetic form with at least a portion of one or both the first set of data and the plurality of sets of synthetic data.

18. The process of claim 17, further comprising the process step of shifting at least a portion of one or both the plurality of sets of synthetic data and the first set of data to an incorrect position within one or both the synthetic form or the background data.

19. The process of claim 18, further comprising the process step of adding noise to at least a portion of one or more of the plurality of sets of synthetic data, the first set of data, the synthetic form, or the background data, wherein adding noise is variable.

* * * * *